(12) United States Patent
Peng et al.

(10) Patent No.: US 11,741,871 B2
(45) Date of Patent: Aug. 29, 2023

(54) IMAGE COMPENSATION FOR FOLDABLE DEVICES

(71) Applicant: GOOGLE LLC, Mountain View, CA (US)

(72) Inventors: Yenyu Peng, New Taipei (TW); Yu-Ting Chung, New Taipei (TW)

( * ) Notice: Subject to any disclaimer, the term of this patent is extended or adjusted under 35 U.S.C. 154(b) by 0 days.

(21) Appl. No.: 17/758,940

(22) PCT Filed: Jan. 24, 2020

(86) PCT No.: PCT/US2020/015012
§ 371 (c)(1),
(2) Date: Jul. 15, 2022

(87) PCT Pub. No.: WO2021/150243
PCT Pub. Date: Jul. 29, 2021

(65) Prior Publication Data
US 2023/0005402 A1   Jan. 5, 2023

(51) Int. Cl.
*G09G 3/00* (2006.01)
*G06T 7/90* (2017.01)
(Continued)

(52) U.S. Cl.
CPC .............. *G09G 3/035* (2020.08); *G01S 13/72* (2013.01); *G06F 3/012* (2013.01); *G06F 3/013* (2013.01);
(Continued)

(58) Field of Classification Search
CPC .............. G09G 3/035; G09G 3/3208; G09G 2320/0233; G09G 2320/0242;
(Continued)

(56) References Cited

U.S. PATENT DOCUMENTS

2012/0249622 A1* 10/2012 Yoshida ............... G06F 1/1616
345/698
2015/0221065 A1* 8/2015 Kim ..................... G09G 3/2092
345/660
(Continued)

FOREIGN PATENT DOCUMENTS

| CN | 108305579 A | 7/2018 |
|---|---|---|
| EP | 2902870 A2 | 8/2015 |
| EP | 2988206 A1 | 2/2016 |

OTHER PUBLICATIONS

International Search Report and Written Opinion for PCT Application No. PCT/US2020/015012, dated Oct. 6, 2020, 18 pages.
(Continued)

*Primary Examiner* — Amare Mengistu
*Assistant Examiner* — Gloryvid Figueroa-Gibson
(74) *Attorney, Agent, or Firm* — Fish & Richardson P.C.

(57) ABSTRACT

Foldable displays may have portions folded into a folded configuration. Each folded portion may be observed by a user at a different viewing angle. As such, folding-artifacts may appear in the displayed image as a result of the different viewing angles. For example, a perceptible color difference and/or a perceptible brightness difference may appear between folded portions. Disclosed here are systems and methods to create compensated images that when displayed reduced the folding artifacts. The creation may include sensing a viewing angle for each portion and determining adjustments for pixels in each portion using a display model. The display model may be created by measuring color and brightness of pixels for various folded configurations, viewpoints and/or viewing angles.

21 Claims, 15 Drawing Sheets

(51) Int. Cl.
    *G01S 13/72* (2006.01)
    *G06F 3/01* (2006.01)
    *G09G 3/3208* (2016.01)

(52) U.S. Cl.
    CPC ............ *G06T 7/90* (2017.01); *G09G 3/3208* (2013.01); *G09G 2320/0233* (2013.01); *G09G 2320/0242* (2013.01); *G09G 2320/0666* (2013.01); *G09G 2320/0693* (2013.01); *G09G 2354/00* (2013.01)

(58) Field of Classification Search
    CPC ... G09G 2320/0666; G09G 2320/0693; G09G 2354/00; G06T 7/90; G01S 13/72; G06F 3/012; G06F 3/013
    USPC .......................................................... 345/694
    See application file for complete search history.

(56) References Cited

U.S. PATENT DOCUMENTS

| | | | |
|---|---|---|---|
| 2016/0202758 A1* | 7/2016 | Peana | G06F 3/013 345/601 |
| 2018/0122302 A1 | 5/2018 | Koong | |
| 2019/0051230 A1* | 2/2019 | Jeon | H10K 59/351 |
| 2019/0221173 A1* | 7/2019 | Lee | G02F 1/1323 |

OTHER PUBLICATIONS

International Preliminary Report on Patentability in International Appln. No. PCT/US2020/015012, dated Aug. 4, 2022, 16 pages.

\* cited by examiner

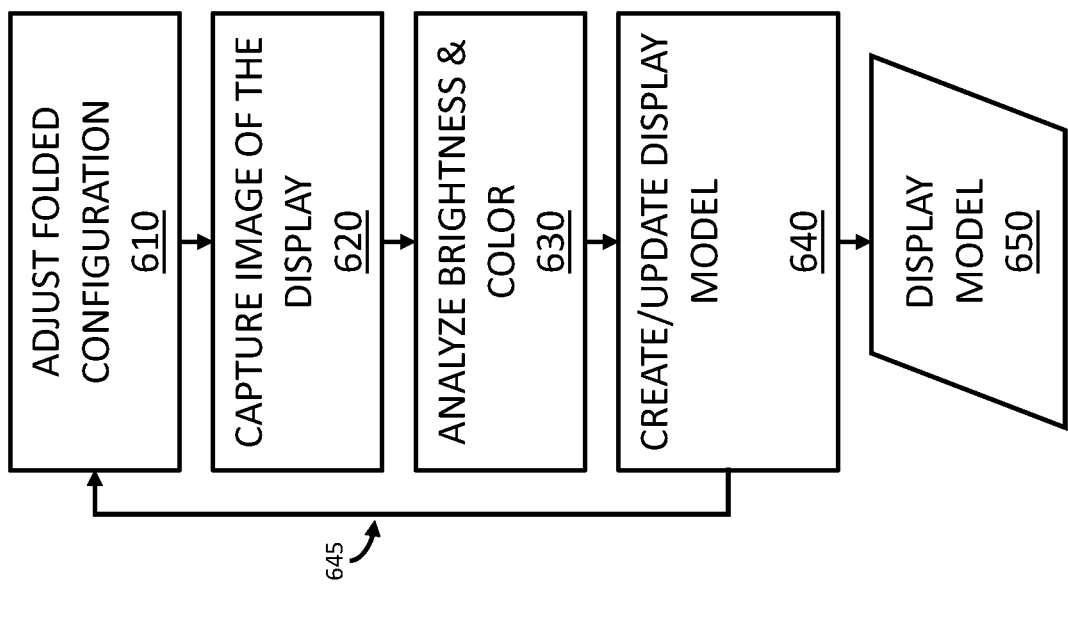

IMAGE COMPENSATION FOR FOLDABLE DEVICES

CROSS REFERENCE TO RELATED APPLICATION

This application is a 35 U.S.C. § 371 National Phase Entry Application from PCT/US2020/015012 filed Jan. 24, 2020, designating the U.S., the disclosure of which is incorporated herein by reference in its entirety.

FIELD OF THE DISCLOSURE

The present disclosure relates to visual displays and, more specifically, to a mobile computing device having a flexible display that is configured to adjust signals sent to the flexible display when it is in a folded configuration in order to reduce visual artifacts caused by the folding.

BACKGROUND

A visual display can be fabricated using flexible films (e.g., a flexible plastic substrate). The flexibility of the display may be used to allow electronic devices to be folded. For example, a mobile computing device, such as a mobile phone or a tablet computer utilizing a flexible display can be folded over a range of folding angles and into a variety of folded configurations. In a folded configuration, a user may view portions of the flexible display at different viewing angles. Because a visual performance of a display may depend on viewing angle, a user may perceive variations in a display image when the device is in a folded configuration.

SUMMARY

In at least one aspect, the present disclosure generally describes a computing device. The computing device includes a display that is capable of being configured into a folded configuration, in which portions of the display are at different viewing angles with a user. The computing device further includes a memory that is configured to store a display model that relates adjustments in brightness and color of pixels (i.e., pixel adjustments) to viewing angles. The computing device further includes at least one sensor that is configured to sense the user and the display. The computing device further includes a processor. The processor can be configured by software instructions to perform a method. The method includes receiving data from the at least one sensor. Based on the (received) data, the method includes determining the folded configuration of the display and determining viewing angles of the user relative to the portions of the display. The method also includes accessing the display model stored in the memory with the viewing angles for the portion of the display to adjust pixels of the display. The adjustment causes folding artifacts (i.e., as perceived by a user) in an image displayed in the folded configuration to be reduced for the user.

The computing device may be a mobile computing device such as a mobile phone or a tablet computer. The display may be an organic light emitting diode (OLED) display. The folded configuration in which portions of the display are at different viewing angles with the user may include: a spine portion, a first-folded portion and a second-folded portion, the first-folded portion folded at a first-bending angle with the spine portion and the second-folded portion folded at a second-bending angle with the spine portion. The display model may be stored in a look-up table. The look-up table may include fold-compensation factors that relate adjustments in brightness and/or color of a pixel to viewing angles. Accessing the display model stored in the memory with the viewing angles for the portions of the display may include determining a fold-compensation factor for a pixel from the look-up table based on the viewing angle of the portion of the display including the pixel. The at least one sensor may include a camera configured to capture an image of the user. Data from the camera may include eye-tracking data corresponding to a sight-line of the user. The at least one sensor may include a first inertial measurement unit affixed to a first-folded portion of the display and a second inertial measurement unit affixed to a second-folded portion of the display. The determining, based on the data, that the display is in the folded configuration may include comparing data from the first inertial measurement unit and the second inertial measurement unit. The at least one sensor may include a Hall-effect sensor proximate with a magnet affixed to a spine portion of the display. The at least one sensor may include a radar having three receivers. Data from the radar may include head-tracking data corresponding a sight-line of the user. The accessing the display model stored in the memory with the viewing angles for the portions of the display to adjust pixels of the display so that folding-artifacts in an image displayed in the folded configuration are reduced may include adjusting digital levels of pixels in an image or a video. The display model may be created for the mobile computing device at a time before the mobile computing device is used by the user. The folding-artifacts may include a color difference or a brightness difference between the portions of the display that are at different viewing angles with the user.

In another aspect, the present disclosure generally describes a method for reducing folding-artifacts in an image displayed on a display of a mobile computing device in a folded configuration. The method includes receiving data from at least one sensor (e.g., that senses a user and the display). Based on the (received) data, the method includes determining the folded configuration of the display and determining viewing angles of a user relative to portions of the display. The method also includes accessing a display model stored in a memory of the mobile computing device with the viewing angles for the portions of the display to adjust pixels (e.g., pixel brightness and/or pixel color) of the display so that folding artifacts in an image displayed in the folded configuration are reduced for the user.

The method may further comprise creating a display model, wherein the creating includes: folding a portion of the display; capturing an image of the display from a view-point at a viewing angle with the portion of the display; determining, from the image, a brightness and a color of pixels in the portion of the display; updating the display model to relate the brightness and the color of the pixels in the portion of the display to the viewing angle; and repeating the folding, the capturing, the determining, and the updating for other folded configurations, from other view-points, and at other viewing angles to create the display model.

In another aspect, the present disclosure generally describes a non-transitory computer readable medium containing computer-readable instructions that when executed by a processor of a mobile computing device cause the mobile computing device to perform a method for reducing folding-artifacts in an image displayed on a display of the mobile computing device in a folded configuration. The method includes receiving data from at least one sensor (e.g., that senses a user and the display). Based on the (received) data, the method includes determining a folded configuration of the display and determining viewing angles of a user relative to portions of the display. The method also includes accessing a display model stored in a memory of the mobile computing device with the viewing angles for the portions of the display to adjust pixels of the display (e.g., adjust each pixel's color and/or brightness) so that folding-artifacts in an image displayed in the folded configuration are reduced for the user.

In another aspect, the present disclosure generally describes a system. The system includes a display device. The display device includes a display that is capable of being configured into a folded configuration, in which portions of the display are positioned at different viewing angles with respect to a user and at least one sensor that is configured to sense the user and the display. The system also includes a computing device. The computing device includes a memory that is configured to store a display model that relates adjustments in brightness and/or color of pixels to viewing angles and a processor that can be configured by software instructions to perform a method. The method includes receiving data from the at least one sensor and determining, based on the data, viewing angles of the user relative to the portions of the display. The method further includes accessing the display model stored in the memory with the viewing angles for the portions of the display to adjust pixels of the display so that folding-artifacts in an image displayed in the folded configuration are reduced for the user.

In a possible implementation of the system, the display device and the computing device are physically separate. In other implementations the system may be a mobile device and the display and computing device may be parts of the mobile computing device.

It will be appreciated that implementations can be combined. For example, features described in the context of a computing device above can also be implemented by way of a method and/or non-transitory computer readable medium.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIG. 6 is a flow chart of a method for creating/updating a display model according to a possible implementation of the present disclosure.

The components in the drawings are not necessarily to scale relative to each other. Like reference symbols in the various drawings indicate like elements.

DETAILED DESCRIPTION

Figure 1A:
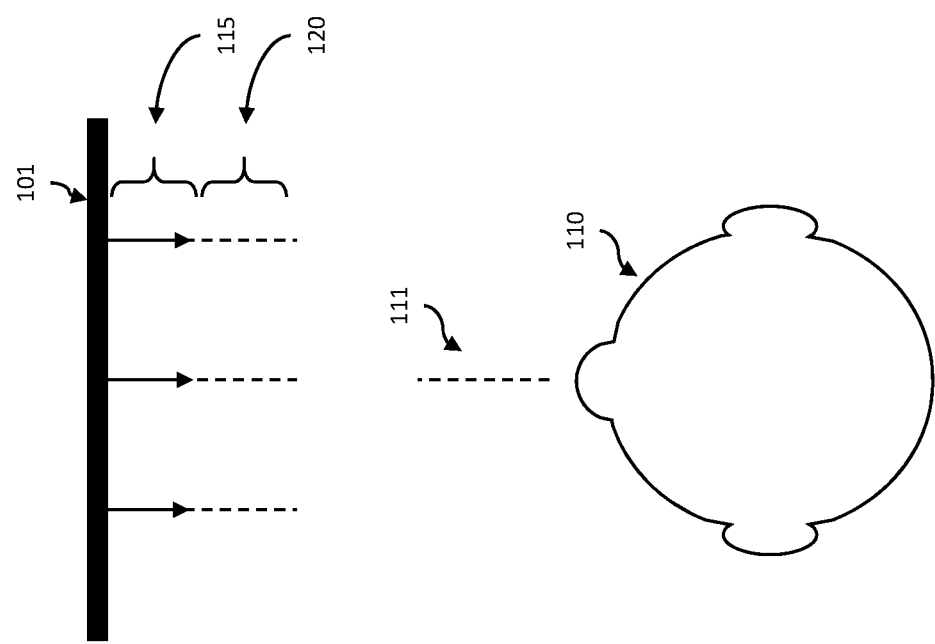
FIG. 1A graphically illustrates a display in an unfolded configuration observed by a user according to an implementation of the present disclosure.

A mobile computing device (e.g., a mobile phone, tablet computer, etc.) having flexible display (i.e., display) may be positioned in a folded configuration in which a user may view portions of the display at different viewing angles. The viewing-angle variation may lead to folding-artifacts in an image displayed on the folded display. The folding-artifacts may include a variation in a perceived color between portions of the display. For example, white pixels in a portion of the display directly facing a user (i.e., normal to the user) may appear as a different shade of white than white pixels in a portion of the display folded at an angle with the user. The folding-artifacts may also include a variation in a perceived brightness between portions of the display. For example, pixels in a portion of the display normal to the user may appear brighter than pixels in a portion of the display folded at an angle with the user even though the pixels are intended to be at the same brightness level. The uneven (i.e., inhomogeneous) color and/or brightness may be annoying or unacceptable to a user, especially when the user is expecting the visual performance of a flat display. The present disclosure describes systems and methods to minimize folding-artifacts (e.g., inhomogeneous color or brightness) associated with a foldable device (e.g., tablet, mobile phone or other display) having a flexible display (e.g., an organic light emitting diode (OLED) display).

To minimize folding-artifacts for a mobile computing device having a flexible display (i.e., foldable display), a display model can be generated from measurements at a time prior to use by a user (e.g., factory set) and stored in the memory of the mobile computing device. The display model may be based on tests (i.e., measurements) of folding-artifacts at various viewing angles with respect to portions of the display folded at various folding angles. The results of the tests may be expressed in the model as fold-compensation factors. In use, the stored model can be accessed using a folding angle of the device and/or a viewing angle of a user, to obtain fold-compensation factors. The fold-compensation factors may be used to adjust signals sent to the display (e.g., pixel-level signal) so that portions (e.g., all portions) of the display appear, to a user viewing the portions at various viewing angels, as the same brightness and/or as the same color (e.g., shade of a color). In what follows, these general aspects of the disclosure are described in greater detail.

As mentioned, the flexible display may be an OLED display. Pixels of the OLED display include individually driven (i.e., switched and biased) light emitting diodes. In a color display, a pixel may include a combination of red, blue, and green LEDs. The LEDs may be designed and arranged to have an optimal viewing angle (i.e., optimal viewing direction) that is normal to the surface of the display. The brightness (i.e., luminous intensity) of the LEDs may be maximum when viewed at the optimal viewing angle and may decrease as the viewing angle deviates from the optimal viewing angle. Because pixel color is related to a carefully calibrated intensity combination of red, green, and blue light, and because perceived brightness as a function of viewing angle may be different for different color LEDs, the color of a pixel may appear to shift as the viewing angle alters the perceived relative intensity of the red, blue, and green light.

FIG. 1A graphically illustrates a top-view of a display 101 (e.g., OLED display) in an unfolded (i.e., flat) configuration observed by a user 110 from a position located along a sight-line 111 that is orthogonal (i.e., normal) to a front surface of the display 101. For this example, the normal direction is considered the optimal viewing angle; however, a display could be optimized for a different optimal viewing angle. In this configuration, the user 110 primarily receives light 115 from the display in a direction aligned with the sight-line 111 (i.e., line-of-sight, viewing angle, viewing direction) of the user. In other words, while the display may emit light in a variety of directions, the user will receive most light in a direction aligned with the sight-line 111 of the user. For this reason, the light 115 shown in the FIG. 1A is aligned with the sight-line 111 of the user 110.

In the configuration shown in FIG. 1A, the light 115 primarily received by the user is aligned with the optimal viewing angle (i.e., optimal viewing direction) of the display. In other words, the light primarily received by the user will be light in a direction aligned with the optimal-viewing direction 120 of the display, which as described previously may (for some implementations) be normal to the display's front surface. Additionally, in the flat configuration, the light 115 primarily received by the user has the same directional relationship with the optimal-viewing direction 120 for all portions of the display.

Figure 1B:
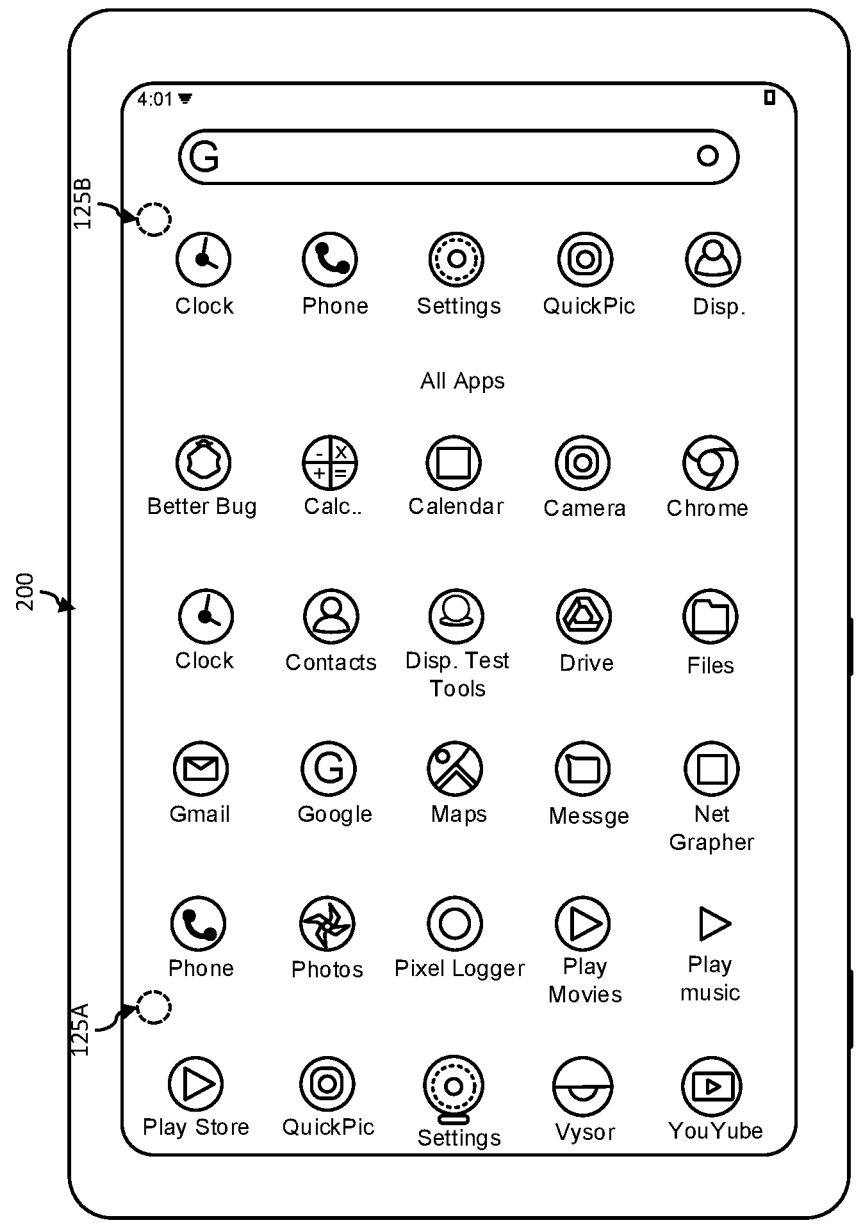
FIG. 1B is a display of a mobile computing device according to an implementation of the present disclosure configured according to FIG. 1A showing no folding-artifacts.

FIG. 1B is a front-view of a display of a mobile computing device 200 in the unfolded (i.e., flat) configuration of FIG. 1A. As shown FIG. 1B, an image presented on the display of a mobile computing device in a flat configuration can appear to a user (i.e., can be perceived by a user) as substantially homogeneous in color and brightness (i.e., no folding-artifacts). For example, as shown in FIG. 1B, the user's perception of background pixels of a displayed image in a first area 125A of the display, which are programmed to be "white," can have a perceived brightness and color that is substantially similar (e.g., within 1%) as the perceived brightness and color of background pixels in a second area 125B of the display, which are programmed to be displayed as "white."

Figure 2A:
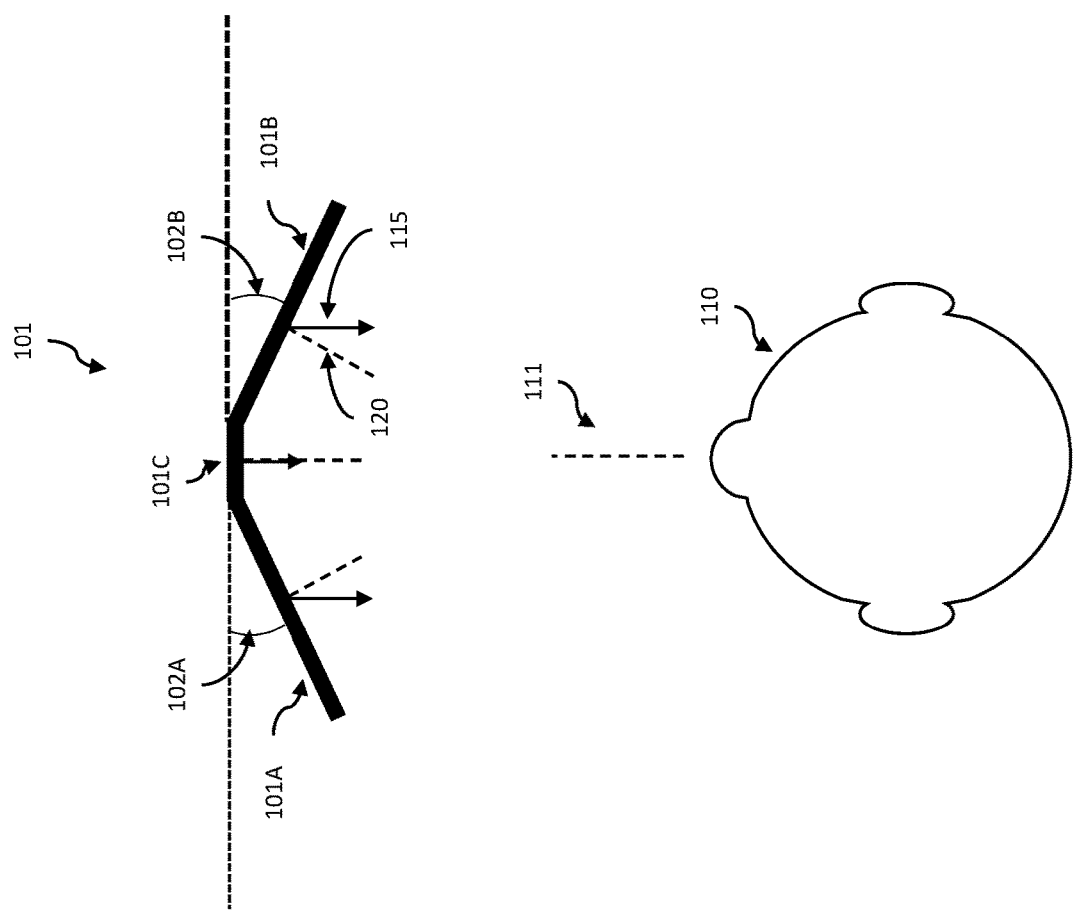
FIG. 2A graphically illustrates a display in a possible folded configuration observed by a user according to an implementation of the present disclosure.

FIG. 2A graphically illustrates a top-view of the display 101 in a folded (i.e., bent) configuration observed by a user 110. In this configuration, the display 101 may be described as having three portions. A first-folded portion 101A is folded by a first bending angle 102A towards the user, and a second-folded portion 101B is folded by a second bending angle 102B towards the user 110. As shown, the first-folded portion 101A and the second-folded portion 101B are at equal bending angles with a third-folded portion (i.e., the spine portion 101C). The third portion may be referred to as a spine portion 101C of the display. The spine portion 101C does not fold as the folded portions 101A and 101B. It is not necessary for the first-folded portion 101A and the second-folded portion 101B to be at equal angles with the spine portion 101C, and in possible fold configurations these angles are different.

The optimal viewing directions of the display 101 are different in the first-folded portion 101A, the second-folded portion 101B, and the spine portion 101C. The sight-line 111 of the user is aligned with the optimal viewing direction for the spine portion 101C of the display 101 but is not aligned with the optimal viewing direction for the first-folded portion 101A or the second-folded portion 101B. For example, the optimal-viewing direction 120 for the second-folded portion 101B of the display is at an angle with the sight-line 111 of the user 110. The light 115 primarily received by the user 110 from the second-folded portion 101B of the display is at an angle with the optimal-viewing direction 120 of the second-folded portion 101B of the display 101. This angle is referred to as the viewing angle and is a function of both the user's sight-line and the bending angle of the portion of the display.

Figure 2B:
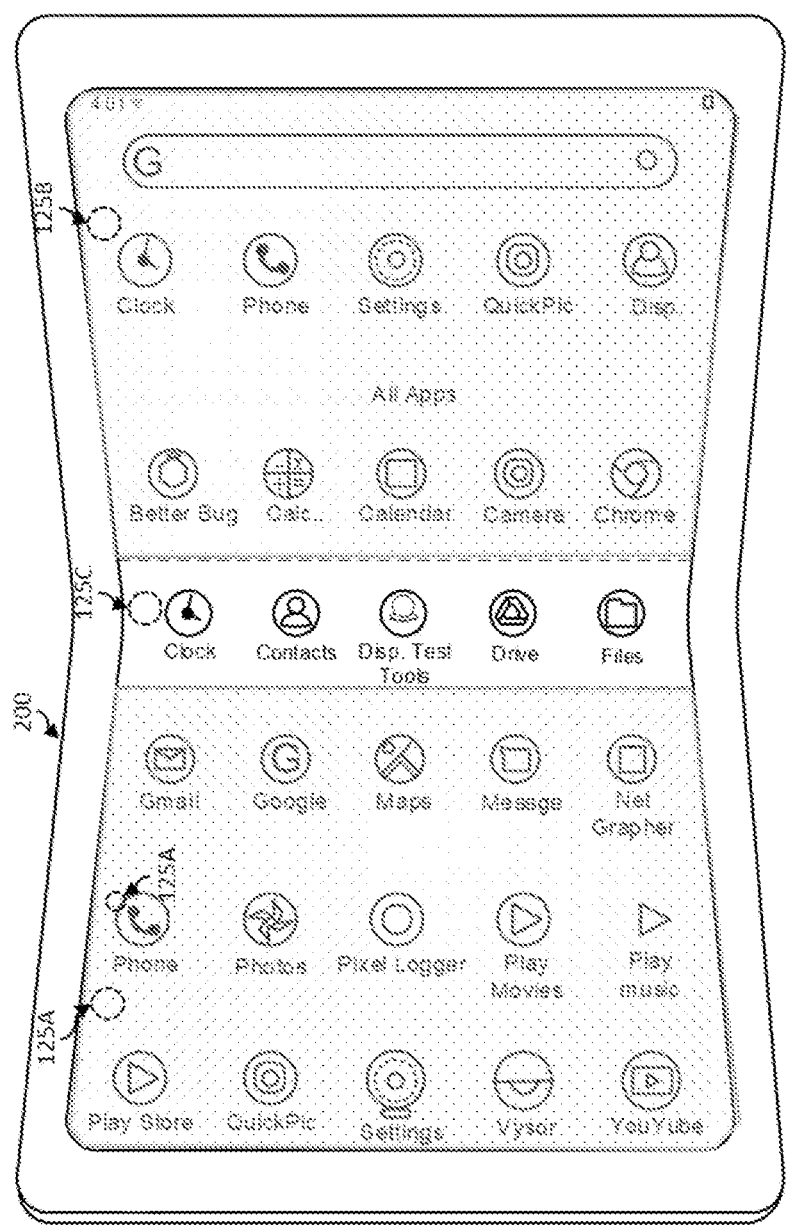
FIG. 2B is a display of a mobile computing device according to an implementation of the present disclosure configured according to FIG. 2A showing a folding-artifact.

FIG. 2B is a front-view of a display of a mobile computing device 200 in the folded configuration of FIG. 2A. The image presented on the display has noticeable folding-artifacts because light from pixels in different areas of the display is not viewed as homogeneous in color and brightness. For example, as shown in FIG. 2B, white background pixels in the first area 125A of the display (i.e., the first-folded portion 101A of the display) appear to have a brightness and color that are different from white background pixels in a in a third area 125C of the display (i.e., the spine portion 101C of the display). For example, the white background pixels in the third area 125C of the display appear brighter and whiter than pixels in either the first area 125A or the second area 125B because the viewing angle of the spine portion of the display is aligned with the optimal viewing angle of the pixels.

White background pixels in the first area 125A of the display (i.e., the first-folded portion 101A of the display) may appear to have a brightness and color that are substantially similar to white background pixels in the second area 125B of the display (i.e., the second-folded portion 101B). This apparent similarity is due, at least in part, to substantially equal (but opposite) viewing angles for the first-folded portion 101A and the second-folded portion 101B.

As mentioned, in possible folding configurations, the bending angles 102A, 102B can be different. For example, a bending angle of the first-folded portion 101A may be approximately zero (e.g., equal to zero) so that it and the spine portion 101C define a flat surface. The flat surface defined by the first-folded portion 101A and the spine portion 101C may be used as a keyboard, while the second-folded portion 101B may be used as a display, such as in the folding configuration shown in FIGS. 3A and 3B.

Figure 3A:
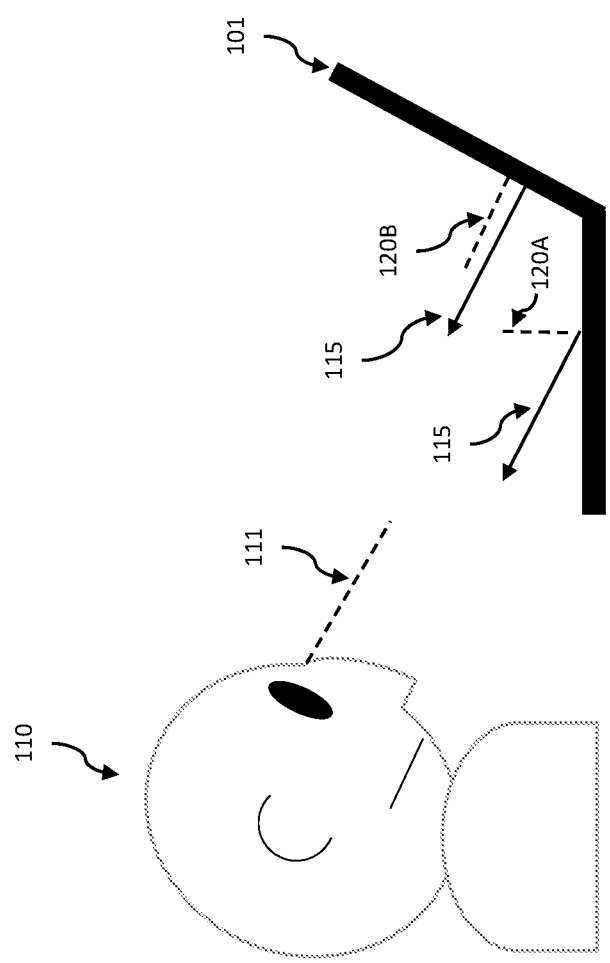
FIG. 3A graphically illustrates a display in a possible folded configuration observed by a user according to an implementation of the present disclosure.

FIG. 3A graphically illustrates a side-view of a display 101 in another possible folded configuration in which the mobile computing device is arranged in a configuration similar to a laptop configuration. As such, a screen portion 310 of the display may be adjusted so that light 115 from this portion can be received by the user primarily along a direction aligned with the sight-line 111 of the user, which is also aligned with the optimal-viewing direction 120B of this portion of the display. A keyboard portion 320 of the display may be aligned with a resting surface. Light 115 from the portion of the display operating as the keyboard can received by the user primarily along a direction aligned with the sight-line 111 of the user, which is not aligned with the optimal-viewing direction 120A of this portion of the display.

Figure 3B:
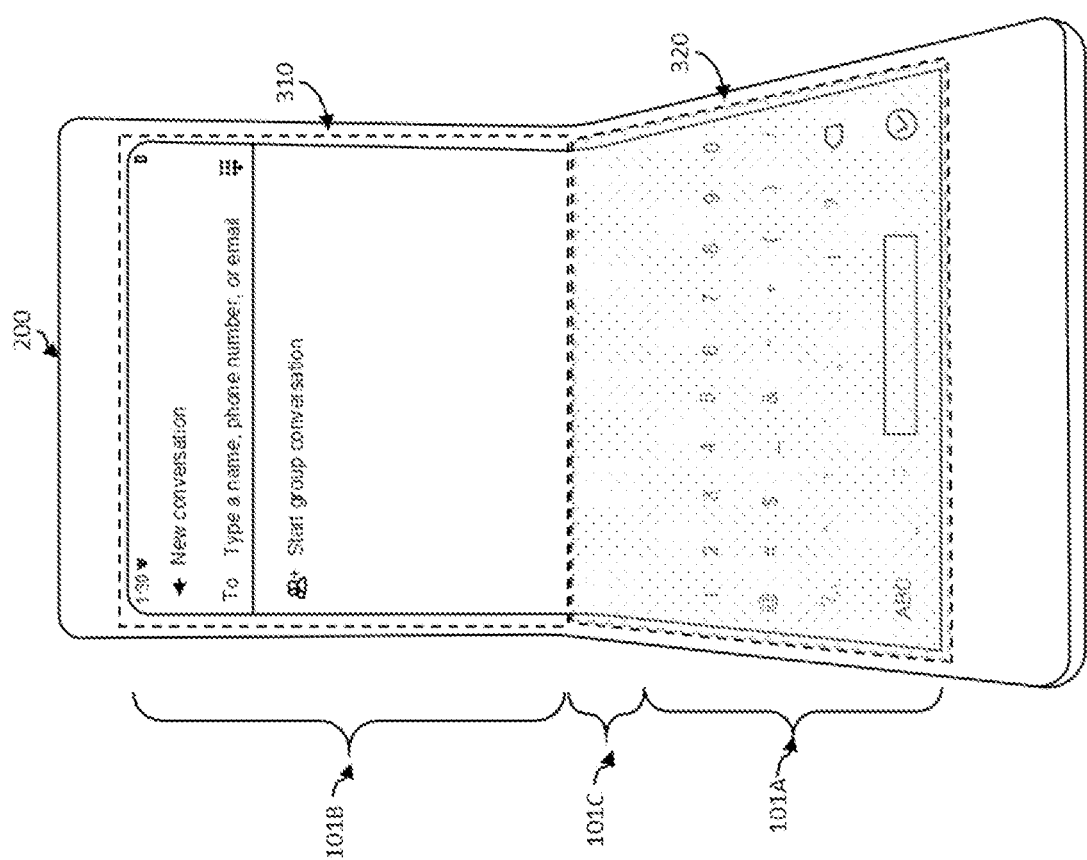
FIG. 3B is a display of a mobile computing device according to an implementation of the present disclosure configured according to FIG. 3A showing a folding-artifact.

FIG. 3B is a front-view of a display of a mobile computing device 200 in the laptop-like configuration of FIG. 3A. The image presented on the display of a mobile computing device 200 in this configuration is inhomogeneous in color and brightness (i.e., has folding-artifacts). The screen portion 310 of the folded display may appear much brighter than the keyboard portion 320 of the display because the sight-line 111 of the user is aligned with the optimal viewing direction of the screen portion 310 but is not aligned with the optimal viewing direction of the keyboard portion 320. This inhomogeneity may not be acceptable to some users.

To make the color and/or brightness of the display appear more uniform (i.e., to minimize folding-artifacts), pixels in a first portion (i.e., a first area) of the folded display may be driven with signals that are adjusted so that, where appropriate, the color and/or brightness of the pixels in the first portion approximately match (e.g., within 1%) the color and/or brightness of pixels in a second portion of the display. For example, in the folded configuration of FIG. 3B pixels in the screen portion 310 of the display may be reduced in brightness to match pixels is the keyboard portion 320 of the display. Alternatively, pixels in the keyboard portion 320 of the display may be increased in brightness to match pixels is the screen portion 310 of the display. Further, intensities of any combination of red, green, and blue (i.e., RGB) subpixels of pixels in the screen portion 310 may be adjusted to match a perceived color of pixels of the keyboard portion 320 of the display (or vice versa).

The adjustment to the signals provided to pixels in portions of a display in a folded configuration may be implemented as fold-compensation factors that when applied (e.g., multiplied, divided, added, subtracted, etc.) to an amplitude of a driving signal for a pixel can adjust an intensity of the pixel (or any combination of the pixel's RGB subpixels). Alternatively, the fold-compensation factors can be applied to digital pixel levels of an image or video to adjust an intensity of the pixel (or any combination of the pixel's RGB subpixels). In other words, a fold-compensation factor can correspond an adjustment in a color and/or brightness of a pixel necessary to minimize a fold-artifact, and this adjustment may be applied in (at least) an image domain or a driving-signal domain.

The amount of adjustment necessary to minimize (e.g., eliminate) folding-artifacts may be related to a folded configuration of the device and a sight-line of a user, which together can define a viewing angle for portions of the display. This relationship can be characterized as a display model. For example, a display model may be implemented as a look-up table. The look-up table may relate fold-compensation factors to possible viewing angles. In this case, accessing the display model may include relating (e.g., matching, interpolating) a viewing angle for a pixel in a folded portion of the display to a viewing angle of the folded portion. Alternatively, the display model may be implemented as a neural network. In this case, accessing the model may include inputting a pixel level and a viewing angle into the neural network to compute an adjusted pixel level.

Figure 4:
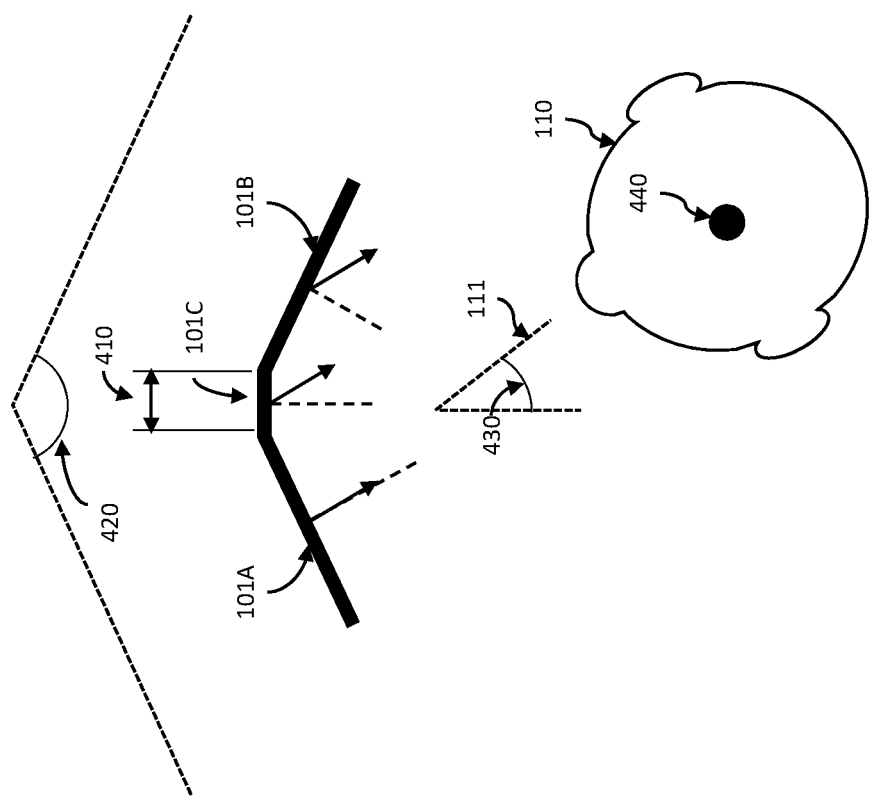
FIG. 4 graphically illustrates a display in a folded configuration observed by a user at a viewing angle according to an implementation of the present disclosure.

FIG. 4 illustrates a top-view of a user and a mobile computing device in a folded configuration. The mobile computing device may have a plurality of portions than can be folded relative to one another. A user may observe the display from a view-point that is not aligned with any particular portion. Accordingly, determining a viewing angle for a particular portion may include determining a bending angle for each portion. Alternatively, when the first-folded portion 101A and the second-folded portion 101B have the same bending angle, a folding angle 420 for the mobile computing device may be determined. The folding angle 420 and a dimension 410 of the spine portion 101C may be sufficient to determine the arrangement and orientations of the portions of the display. Due to fabrication tolerances the dimension 410 of the spine portion 101C may vary (e.g., within 10%).

Determining a viewing angle for a particular portion may also include determining a view-point 440 and/or a sight-line 111 of the user 110. The view-point 440 may be a position relative to a coordinate system centered on the display, while a sight-line may be a direction or angle from the view-point to the display (or vice versa). For example, a viewing angle 430 for the spine portion 101C of the display is shown in FIG. 4. Based on the folding angle 420 and the view-point 440, the viewing angle for the first-folded portion 101A is smaller than the viewing angle 430 for the spine portion 101C (i.e., is zero as shown), while the viewing angle for the second-folded portion 101B is larger than the viewing angle 430 for the spine portion 101C. For a folded configuration portions of the display are at different viewing angles with a view-point (e.g., a view-point of a user).

As shown in FIG. 4, for a display having a first-folded portion 101A, a second-folded portion 101B, and a spine portion 101C, the dimension 410 of the spine portion 101C, can be used in assigning the pixels of the display to a particular portion. The pixels within each portion of the display can be assumed to have the same viewing angle. Accordingly, an adjustment to compensate for folding-artifacts may be applied to each pixel in the portion. The adjustment can require a determination of the viewing angle of the portion.

Adjusting pixels in portions of a folded display so that all pixels appear to have the same color and/or brightness may require a model of a relationship between a pixel's color/brightness and viewing angle. Accordingly, a display model maybe created to specify this relationship. Using the display model adjustments for pixels in each portion may be derived. For example, the display model may return a color/brightness of a pixel viewed at a viewing angle. From the returned color/brightness, an adjustment may be determined. Alternatively, the display model may return color/brightness adjustments necessary for pixels in a portion to appear as pixels in another portion (e.g., a portion viewed along an optimal viewing direction).

A display model may be created at a time before use by a user. For example, creating the display model may be part of a calibration or factory-setting that occurs as part of a fabrication/test process. Once created, the display model may be stored in a memory that is accessible to the mobile computing device. For example, the display model may be stored locally in memory of the mobile computing device. The display model can be accessed whenever the display is folded so that adjusted-images (i.e., compensated-images), in which the folding-artifacts are reduced (i.e., from a viewer's perspective), can be displayed (e.g., in real-time). The reduction of folding-artifacts in compensated-images may be a reduction as compared to unadjusted images, and in some cases, the folding-artifacts in compensated-images displayed may be eliminated.

Figure 5:
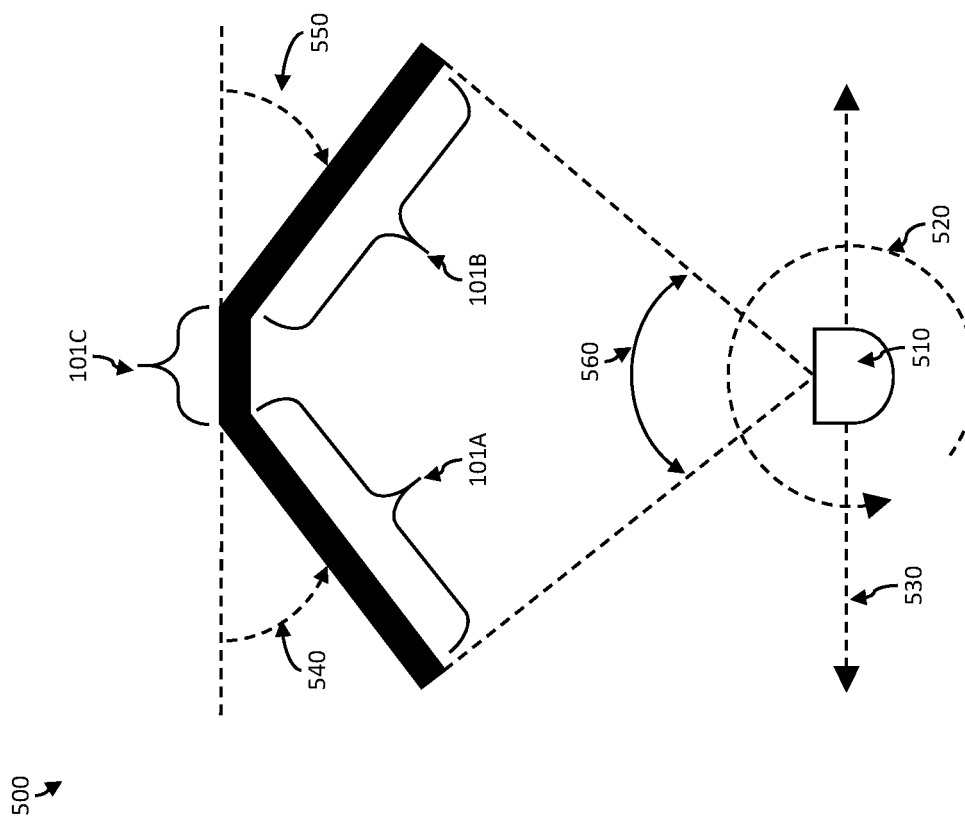
FIG. 5 graphically illustrates test setup for creating a display model according to an implementation of the present disclosure

FIG. 5 illustrates a top-view of a possible test-setup (i.e., calibration setup) for creating a display model. In the test-setup 500, a foldable display is positioned within a field-of-view 560 of a camera 510 (e.g., a CCD camera) so that a measurement-image of the portions of the display can be captured from a particular viewpoint and at a particular viewing angle. The measurement-image can be analyzed to determine the dimensions (i.e., the pixels within) the first-folded portion 101A, the second-folded portion 101B, and the spine portion 101C of the display. The measurement-image can also be analyzed to determine (i.e., measure) a brightness and a color of the imaged pixels. The measurement-image may have a resolution that is higher than the pixel resolution of the display so the measurement of the color/brightness of the pixels may be averaged over pixels in the measurement-image. Additionally, one or more test-images may be displayed on the display to help in the determination of the brightness and color of pixels. The viewing angle of each portion of the display may be determined by the arrangement of the test-setup. For example, sensors may determine the position and orientation of the camera as well as the folded configuration of the display. The relationships between viewing angle, portions, brightness, and color may be recorded as part of a display model. This process may be repeated to update the display mode for other folded configuration, from other view-points and at other viewing angles.

In the test setup, the display is configured into a folded configuration. For the implementation shown in FIG. 5, the folded configuration is characterized by the first-folded portion 101A arranged at a first-bending angle 540 (with the spine portion 101C) and the second-folded portion 101B arranged at a second-bending angle 550. The camera 510 has field-of-view 560 to capture at least all portions of the display. Between iterations of the display-model creation process, the camera 510 may be moved in any direction to adjust the camera's view-point, such as along a direction 530 shown in FIG. 5. The camera may also be rotated, such as along a rotation 520, to adjust the viewing angle of the camera relative to the portions of the display. Alternatively, the display may be moved/rotated relative to the camera.

FIG. 6 is a flow chart of a method for creating/updating a display model according to a possible implementation of the present disclosure. In the method 600, the display is adjusted 610 into a folded configuration in which at least one portion of the display is folded at an angle with another portion or other portions of the display. Next, an image (i.e., measurement-image) of the display, displaying a test-image, is captured 620 using a camera located at a view-point and aligned at a viewing angle or viewing angles with the portions of the display. The measurement-image is then analyzed 630 to determine pixel brightness and/or pixel color for pixels in the portions of the display. The analysis may include analyzing a gamma curve corresponding to the measurement image to determine a pixel's brightness. Additionally, the analysis may include mapping a pixel to a CIE map to determine the pixel's color. Based on the determine of the color and the brightness, a portion of the display model may be created. The method may then be repeated 645 (i.e. iterated) to update 640 the display model to include and/or accommodate other folded configurations (i.e., additional folded configurations), view-points, and/or viewing angles. The display model 650 that results may be stored in a memory, such as the memory of a mobile computing device having the foldable display.

After the display model is created and stored, it may be accessed (e.g., automatically), when the device is in a folded configuration, to adjust a displayed image (or images) to compensate for perceived artifacts (e.g., variation in brightness and/or color) in portions of the display based on their viewing angle between a user and the portions of the display. As part of this process, the folded configuration of the mobile computing device and a sight-line of a user can be characterized by at least one sensor of the mobile computing device.

Figure 7A:
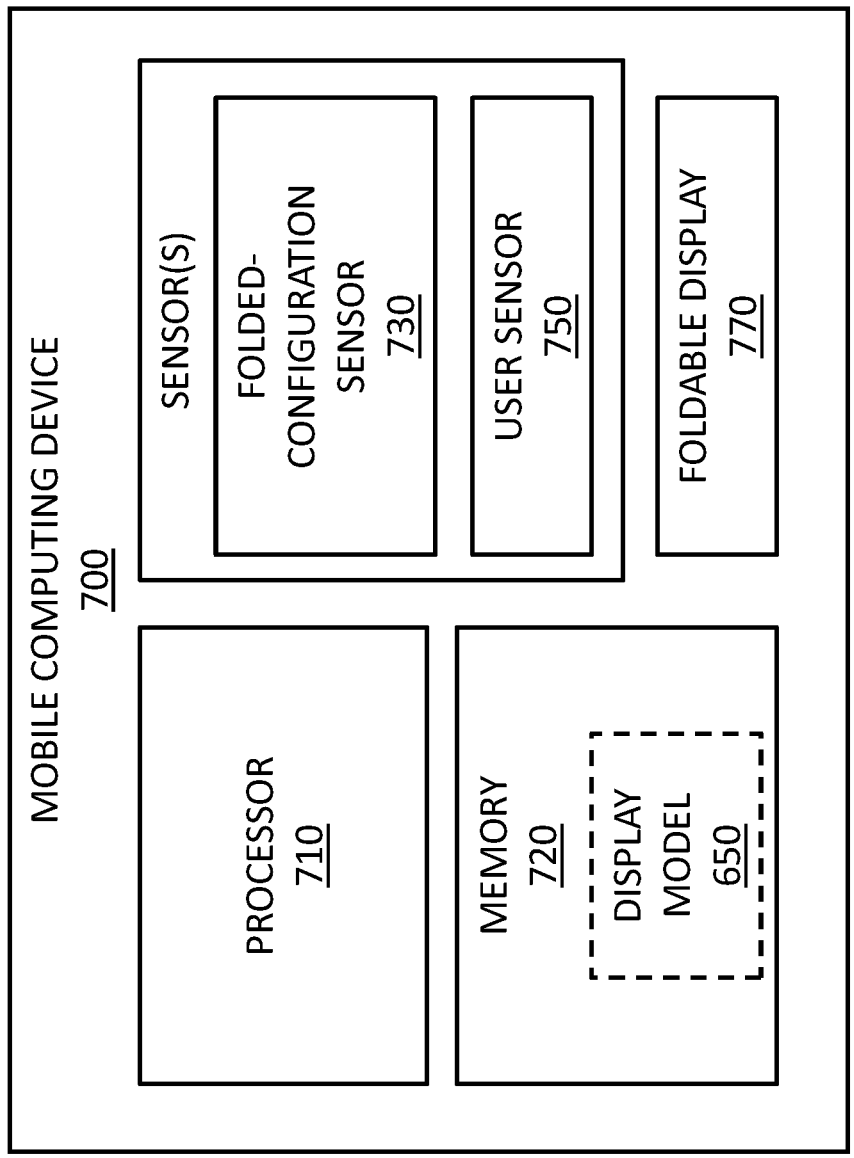
FIG. 7A is a block diagram of a mobile computing device according to a possible implementation of the present disclosure.

FIG. 7A is a block diagram of a mobile computing device according to a possible implementation of the present disclosure. The mobile computing device 700 includes a display capable of being configured into a folded configuration (i.e., a foldable display 770), in which portions of the display are at different viewing angles with a user (or other viewer of the display). The mobile computing device includes a memory 720. The memory 720 can be a non-transitory computer readable medium. The non-transitory computer readable medium can contain computer-readable instructions that can be executed by a processor 710 (e.g., a central processing unit (CPU)) of the mobile computing device to carry out the processes necessary for reducing folding-artifacts in an image (or images) display on the foldable display 770. Additionally, the memory 720 may store the display model 650, as described previously. The mobile computing device 700 further includes at least one sensor for collecting data that can be used to determine a viewing angle between, which can be used to access the display model 650 to determine the adjustment necessary for images displayed on the foldable display 770.

The at least one sensor can include a folded-configuration sensor 730. The folded-configuration sensor 730 may be configured to collect data related to the folded configuration of the mobile computing device, such as a bending angle (e.g., the first-bending angle 540) of a portion of the device or a folding angle 420 of the mobile computing device.

Figure 7B:
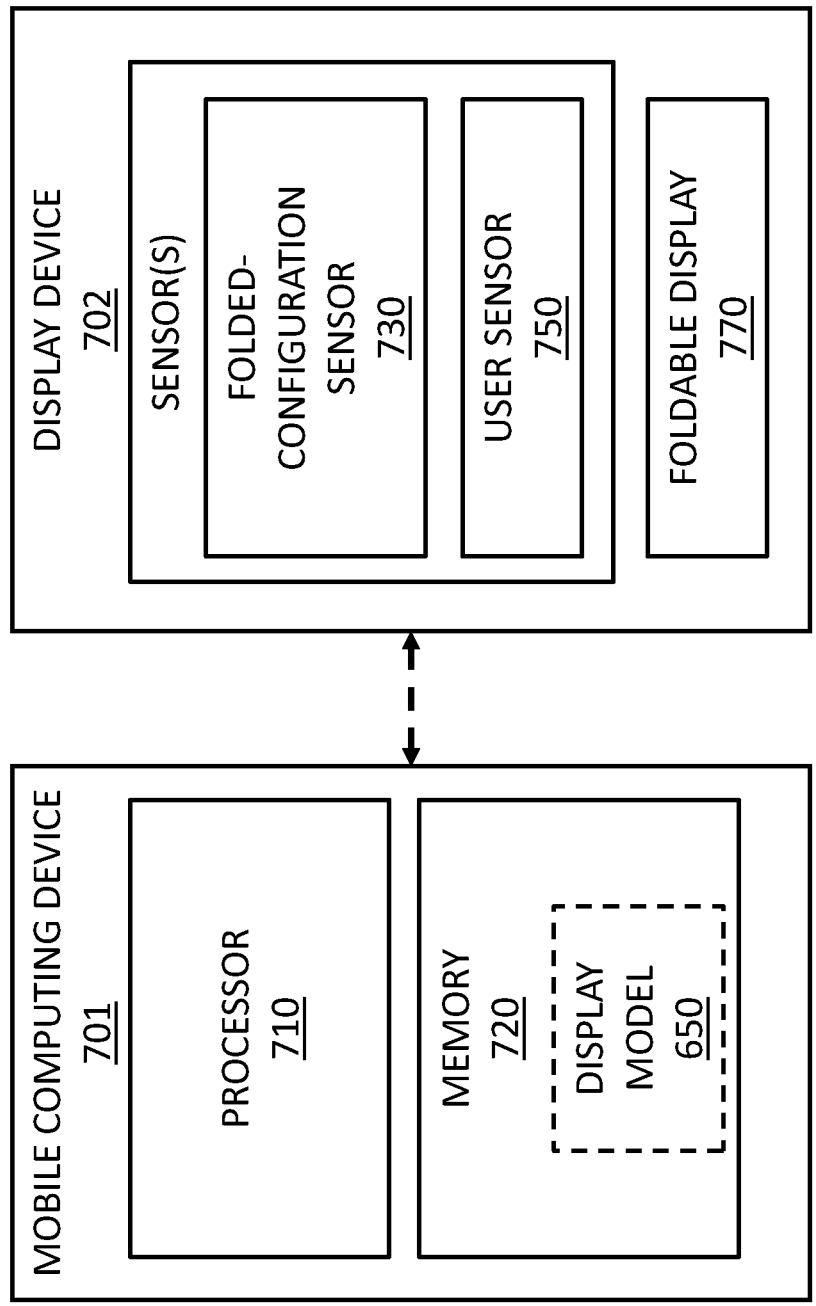
FIG. 7B is a block diagram of a system including a mobile computing device that is physically separate from a display device according to a possible implementation of the present disclosure.

While FIG. 7A illustrates a possible implementation in which the processor and the foldable display are integrated together (e.g., physically combined as parts of a single device), various other possible implementations are within the scope of the present disclosure. For example, FIG. 7B is a block diagram of a system that includes a mobile computing device 701 and a display device 702. The processor 710 of the mobile computing device 701 may be communicatively coupled to the sensor(s) (e.g., the folded-configuration sensor 730, the user sensor 750) of the display device 702 and may also be communicatively coupled to the foldable display 770 of the display device 702. The mobile computing device 701 and the display device 702 may be implemented as physically separate devices. In other words, the mobile computing device 701 and the display device 702 may be communicatively coupled (e.g., wired or wirelessly) over a physical spacing between the devices. Aside from this physical spacing, the implementations shown in FIGS. 7A and 7B may operate similarly.

Figure 8:
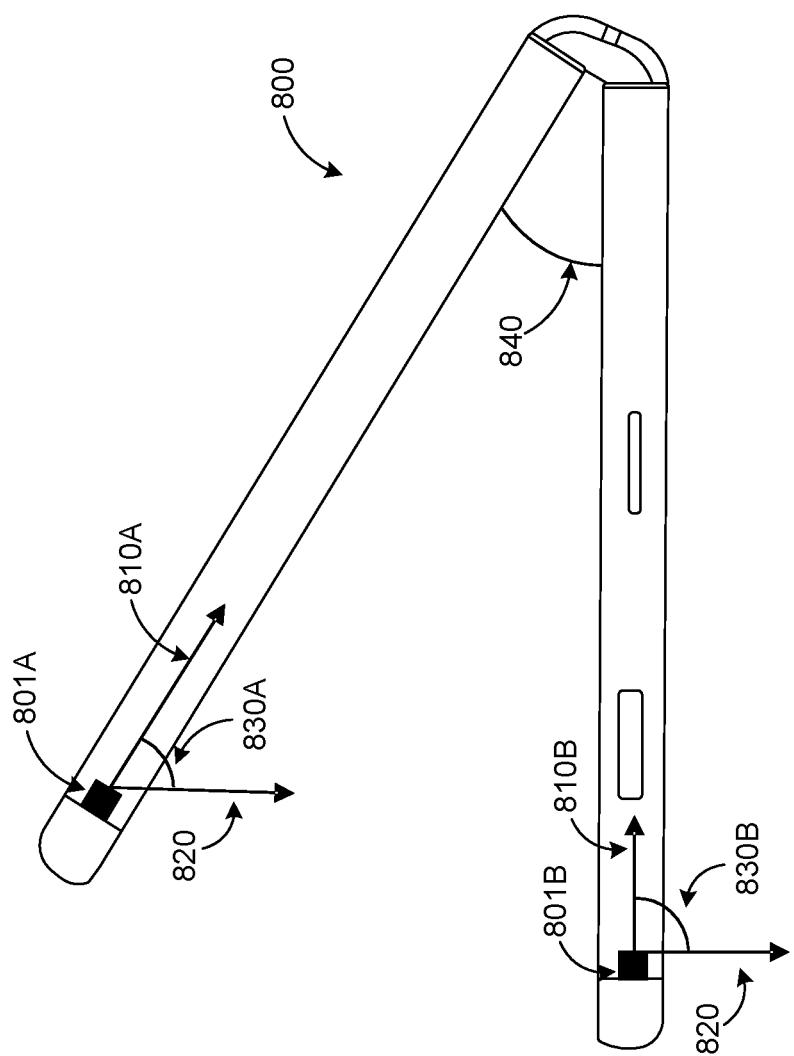
FIG. 8 is a side-view of a mobile computing device with a possible implementation of a folded-configuration sensor shown.

FIG. 8 illustrates a side-view of a possible implementation of a folded-configuration sensor 730. As shown, the folded-configuration sensor 730 includes a first inertial measurement unit (IMU) 801A and a second IMU 801B. The IMUs may be affixed to, or otherwise integrated with, the first-folded portion and the second-folded portion of the mobile computing device 800. The first IMU 801A can be configured to output a first tilt angle 830A between a first sensitivity axis 810A a direction of gravity 820. The second IMU 801B can be configured to output a second tilt angle 830B between a second sensitivity axis 810B the direction of gravity 820. The outputs of each IMU may provide information regarding a folded position of each portion of the mobile computing device. Further, the outputs of the two IMUs may be compared to obtain a folding angle 840 of the mobile computing device 800.

Figure 9:
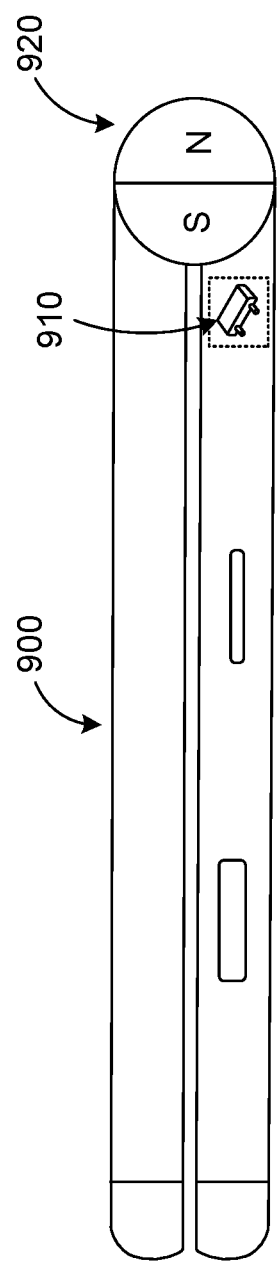
FIG. 9 is a side-view of a mobile computing device with a possible implementation of a folded-configuration sensor shown.

FIG. 9 illustrates another possible implementation of a folded-configuration sensor 730. As shown, the folded-configuration sensor 730 includes a Hall-effect sensor 910 and a magnet 920. For example, the Hall-effect sensor may be proximate with a magnet affixed to a spine portion of the display. The Hall-effect sensor 910 is configured to output a signal (e.g., voltage) as based on a magnetic field strength. The magnet 920 can be configured to rotate according as a folded configuration of the mobile computing device 900 changes. Accordingly, the output of the Hall-effect sensor can be used to determine a folding angle of the mobile computing device 900.

Returning to FIG. 7A, the at least one sensor may also include a user sensor 750 configured to collect data that can facilitate a determination a view-point 440 and/or a sight-line 111 of a user 110. For example, the user sensor 750 may include one or more cameras to image a user. The processor 710 may be configured to perform image processing on the captured images of the user in order to determine a position/orientation of the user's head and/or body. Additionally, face-tracking data, eye-tracking data, and/or head-tracking data may be obtained from image processing the captured images of the user in order to determine a position on the display that the user is focused on (i.e., viewing).

Figure 10:
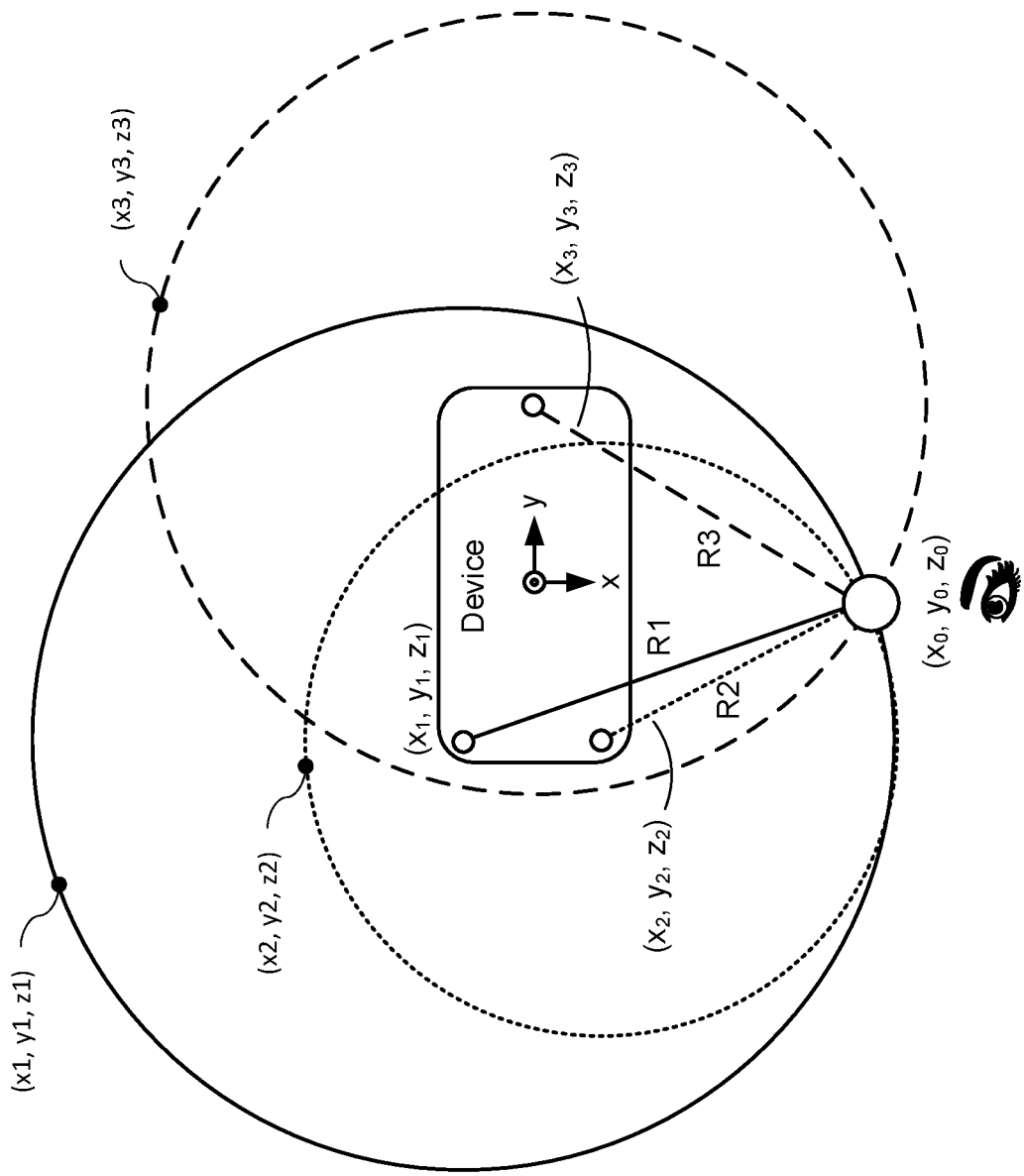
FIG. 10 is a possible implementation of a user sensor according to a possible implementation of the present disclosure.

FIG. 10 illustrates another possible implementation of a user sensor 750. As shown the user sensor 750 includes a radar having a transmitter and three receivers. The three receivers a positioned differently so that an amplitude received by each receiver can be used to determine a three-dimensional position of an object (e.g., a user's head, a user's eye). More specifically a first receiver is positioned at a first relative location $(x_1, y_1, z_1)$, a second receiver is position at a second relative location $(x_2, y_2, z_2)$ and the third receiver is positioned at a third relative location $(x_3, y_3, z_3)$. The amplitude of the received radar signal at the first receiver corresponds to a first range $(R_1)$, the amplitude of the received radar signal at the second receiver corresponds to a second range $(R_2)$, and the amplitude of the received radar signal at the third receiver corresponds to a third range $(R_3)$. Based on the relative locations and the ranges it is possible to calculate a relative position $(x_0, y_0, z_0)$ of the object (e.g., the user's eye) reflecting the radar signal back to the receivers. It is further possible that a user sensor includes data from a plurality of sensors (e.g., camera, radar, etc.) to determine a position/configuration of the user/device.

While some sensors, operating individually, have been presented, it is anticipated that a variety of sensor types and combinations thereof may be used as the at least one sensor configuration for the purpose of determining the viewing angle with portions of a folded display.

Figure 11:
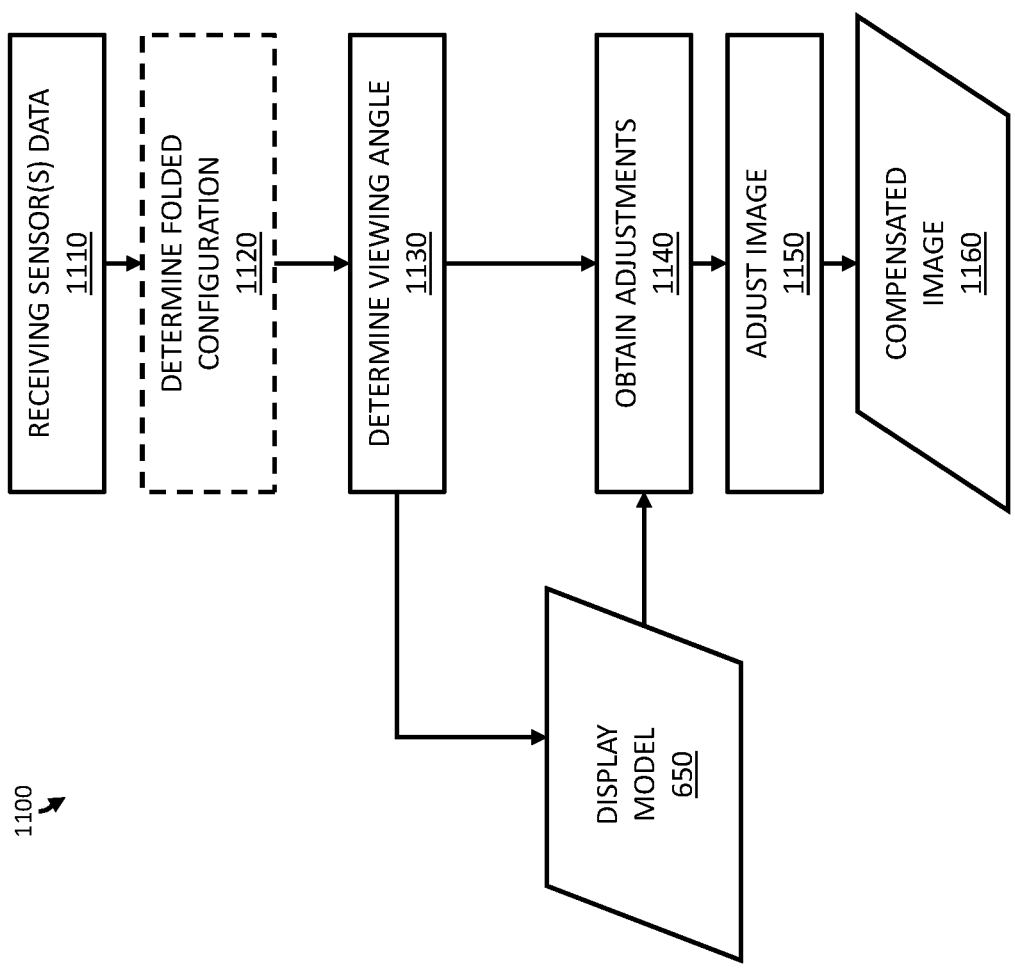
FIG. 11 is a flow chart of a method for reducing folding-artifacts in an image displayed on a display of a mobile computing device in a folded configuration according to a possible implementation of the present disclosure.

FIG. 11 is a flow chart of a method for reducing folding-artifacts in an image displayed on a display of a mobile computing device in a folded configuration according to a possible implementation of the present disclosure. The method includes receiving 1110 data from at least one sensor. In a possible implementation of the method, data from the at least one sensor can be used to determine 1120 that the display is in a folded configuration. This may have an advantage of computational efficiency because in a flat (i.e., unfolded) configuration, compensated images may not be necessary. The method 1100 further includes determining 1130, based on the data from the sensor(s), viewing angles for portions of the display. In some implementations, this operation may further include determining the portions (e.g., boundaries of the portions) of the display so a pixel's adjustment may be applied based on the portion that it is within. The method further includes accessing a display model 650 with the determined viewing angles for each portion of the display to adjust a displayed image. For example, the method may include obtaining 1140 an adjustment (e.g., a fold-compensation factor) from the display model 650 for each portion of the display and adjusting 1150 pixels in each portion of an image according to the portion's adjustment. The adjustment to the image may result a compensated image 1160 in which digital levels of pixels are adjusted by pixel adjustments corresponding to their viewing angle. In other words, pixel adjustments are changes in digital levels pixels to allow the pixels to be perceived as having a similar (e.g., same) color/brightness. When the compensated image is displayed on the folded display, a user may perceive a displayed image in which a color difference or a brightness difference between portions of the display are reduced. A compensated video may be created as a collection of images.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method for reducing folding-artifacts in an image displayed on a display of a computing device in a folded configuration, the method comprising:
receiving data from at least one sensor;
determining, based on the data, that the display is in a folded configuration;
determining, based on the data, viewing angles of a user relative to portions of the display; and
accessing a display model that relates adjustments in a brightness and/or a color of pixels to viewing angles to adjust pixels of the display for the folded configuration using the viewing angles for the portions of the display, wherein the display model is generated from measurements that include:
folding a portion of the display;
capturing an image of the display from a view-point at a viewing angle with the portion of the display;
determining, from the image, a brightness and/or a color of pixels in the portion of the display;
creating a portion of the display model to relate the brightness and/or the color of the pixels in the portion of the display to the viewing angle; and
repeating the folding, the capturing, the determining, and the creating for other folded configurations, from other view-points, and at other viewing angles to create the display model.

2. The method according to claim 1, wherein the portions include a spine portion, a first-folded portion and a second-folded portion, wherein the folded configuration in which portions of the display are at different viewing angles with the user includes:
the first-folded portion folded at a first-bending angle with the spine portion and the second-folded portion folded at a second-bending angle with the spine portion.

3. The method according claim 1, wherein the display model is stored in a look-up table.

4. The method according to claim 3, wherein the look-up table includes fold-compensation factors that relate adjustments in the brightness and/or the color of a pixel to viewing angles.

5. The method according to claim 4, wherein accessing the display model includes:
determining a fold-compensation factor for a pixel from the look-up table based on the viewing angle of the portion of the display including the pixel.

6. The method according to claim 1, wherein the at least one sensor includes a camera configured to capture an image of the user.

7. The method according to claim 6, wherein data from the camera includes eye-tracking data corresponding to a sight-line of the user.

8. The method according to claim 1, wherein the at least one sensor includes a first inertial measurement unit affixed to a first-folded portion of the display and a second inertial measurement unit affixed to a second-folded portion of the display.

9. The method according to claim 8, wherein the determining, based on the data, the folded configuration of the display includes:
comparing data from the first inertial measurement unit and the second inertial measurement unit.

10. The method according to claim 1, wherein the at least one sensor includes a Hall-effect sensor proximate with a magnet affixed to a spine portion of the display.

11. The method according to claim 1, wherein the at least one sensor includes a radar having three receivers.

12. The method according to claim 11, wherein data from the radar includes head-tracking data corresponding a sight-line of the user.

13. The method according to claim 1, wherein accessing the display model that relates adjustments in the brightness and/or the color of pixels to viewing angles to adjust pixels of the display for the determined folded configuration includes:
adjusting digital levels of pixels in an image or a video.

14. The method according to claim 1, wherein the display model is created for at a time before the computing device is used by the user.

15. The method according to claim 1, wherein the folding-artifacts include a color difference or a brightness difference between the portions of the display that are at different viewing angles with the user.

16. The method according to claim 1, wherein the computing device is a mobile phone or a tablet computer.

17. The method according to claim 1, wherein the display is an organic light emitting diode (OLED) display.

18. A non-transitory computer readable medium containing computer-readable instructions that when executed by a processor of a mobile computing device cause the mobile computing device to perform a method that includes:
receiving data from at least one sensor;
determining, based on the data, that a display is in a folded configuration;
determining, based on the data, viewing angles of a user relative to portions of the display; and
accessing a display model that relates adjustments in brightness and/or color of pixels to viewing angles to adjust pixels of the display for the folded configuration using the viewing angles for the portions of the display, wherein the display model is generated from measurements that include:
folding a portion of the display;
capturing an image of the display from a view-point at a viewing angle with the portion of the display;
determining, from the image, a brightness and/or a color of pixels in the portion of the display;
creating a portion of the display model to relate the brightness and/or the color of the pixels in the portion of the display to the viewing angle; and
repeating the folding, the capturing, the determining, and the creating for other folded configurations, from other view-points, and at other viewing angles to create the display model.

19. A system comprising:
a display device including:
a display capable of being configured into a folded configuration, in which portions of the display are positioned at different viewing angles with respect to a user; and
at least one sensor configured to sense the user and the display; and
a computing device including:
a memory; and a processor configured by software instructions to perform a method including:
receiving data from at least one sensor;
determining, based on the data, that the display is in the folded configuration;
determining, based on the data, viewing angles of a user relative to portions of the display; and
accessing a display model that relates adjustments in brightness and/or color of pixels to viewing angles to adjust pixels of the display for the folded configuration using the viewing angles for the portions of the display, wherein the display model is generated from measurements that include:
folding a portion of the display;
capturing an image of the display from a view-point at a viewing angle with the portion of the display;
determining, from the image, a brightness and/or a color of pixels in the portion of the display;
creating a portion of the display model to relate the brightness and/or the color of the pixels in the portion of the display to the viewing angle; and
repeating the folding, the capturing, the determining, and the creating for other folded configurations, from other view-points, and at other viewing angles to create the display model.

20. The system according to claim 19, wherein the display device and the computing device are physically separate.

21. The system according to claim 19, wherein the system comprises a mobile computing device, the mobile computing device comprising the display device and the computing device.

* * * * *